No. 800,044. PATENTED SEPT. 19, 1905.
C. WOLF.
MACHINE FOR THE MANUFACTURE OF MATCHES.
APPLICATION FILED MAR. 21, 1903.

3 SHEETS—SHEET 1.

Witnesses:
Inventor
Carl Wolf

No. 800,044. PATENTED SEPT. 19, 1905.
C. WOLF.
MACHINE FOR THE MANUFACTURE OF MATCHES.
APPLICATION FILED MAR. 21, 1903.

3 SHEETS—SHEET 2.

Witnesses:

Inventor
Carl Wolf
By James L. Norris.
Atty.

No. 800,044. PATENTED SEPT. 19, 1905.
C. WOLF.
MACHINE FOR THE MANUFACTURE OF MATCHES.
APPLICATION FILED MAR. 21, 1903.

3 SHEETS—SHEET 3.

Witnesses:
Inventor
Carl Wolf

UNITED STATES PATENT OFFICE.

CARL WOLF, OF ZWICKAU, GERMANY.

MACHINE FOR THE MANUFACTURE OF MATCHES.

No. 800,044.     Specification of Letters Patent.     Patented Sept. 19, 1905.

Application filed March 21, 1903. Serial No. 148,990.

*To all whom it may concern:*

Be it known that I, CARL WOLF, a subject of the Emperor of Germany, residing at Zwickau, Germany, have invented certain new and useful improvements in machines for the manufacture of matches in the form of bands or strips having inflammable material arranged along the same, of which the following is a specification.

This invention relates to the manufacture of matches in the form of bands or strips of waxed textile material, for example, having inflammable material arranged at intervals along the same and chiefly designed for use in igniting miners' safety-lamps, pocket-lamps, or tinder-boxes, and for like purposes.

The subject of my present invention consists of a machine by means of which both sides of the strips can be successively provided with inflammable material by purely mechanical means, so that the rate of production is considerably increased. The strips, carried by a frame, are led over a rotary roller which is provided with annular projections on which the strips press quite freely, and are thus uniformly provided with inflammable material. Immediately after the application of the inflammable material to one side of the bands the opposite side can be treated in a similar manner by reversing the frame, since there is no abutment—*i. e.*, there are no rods or the like on the frame at the upper side of the strips to press the strips onto the said projections, which rods would be liable to damage the still wet nodules or pieces of inflammable material already applied to the strips.

In the accompanying drawings my improved machine is illustrated, by way of example, in one constructional form.

Figure 1:
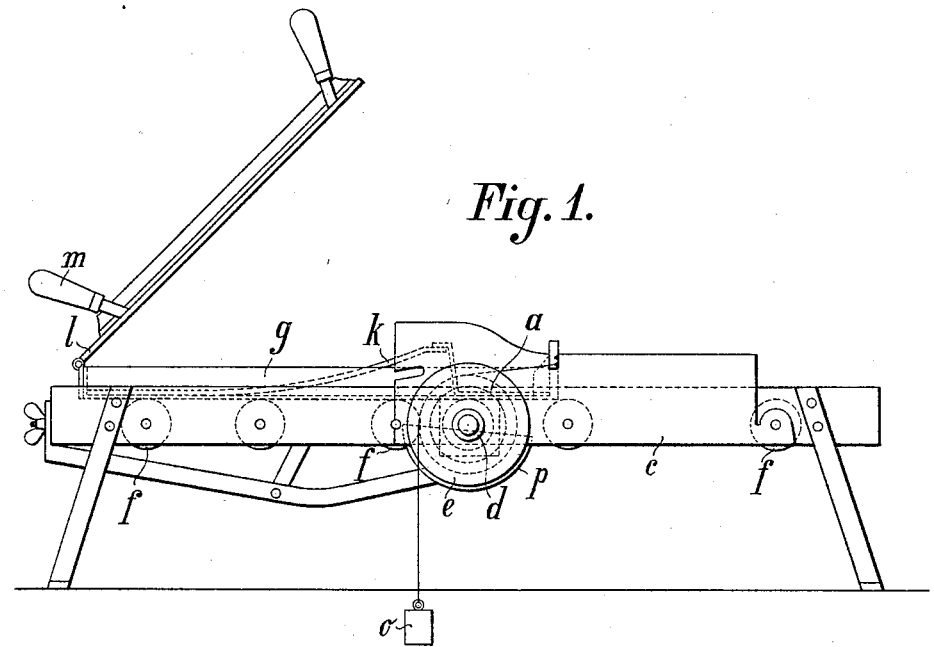
Figure 2:
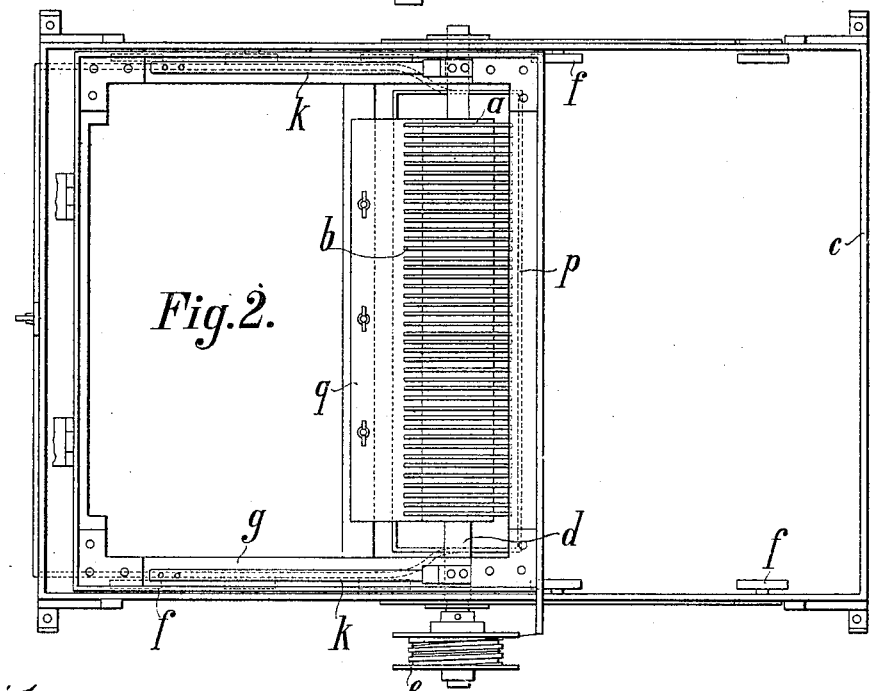
Figure 3:
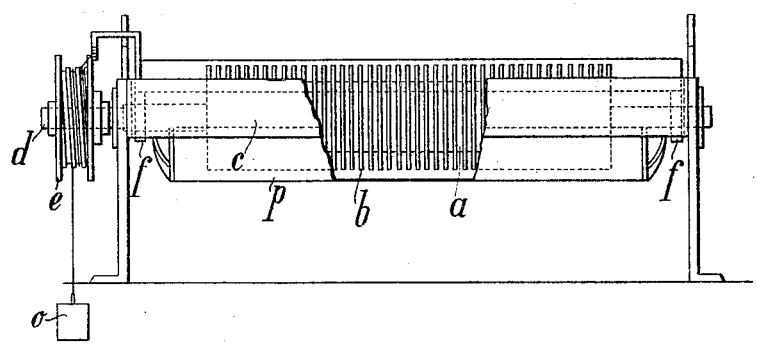
Figure 4:
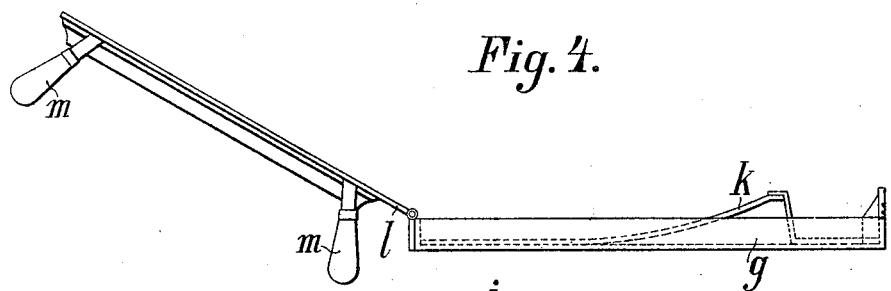
Figure 5:
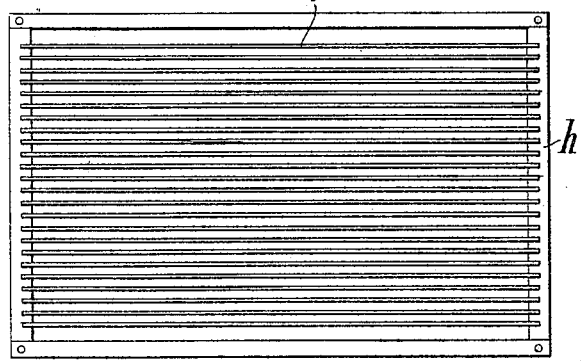
Figure 6:
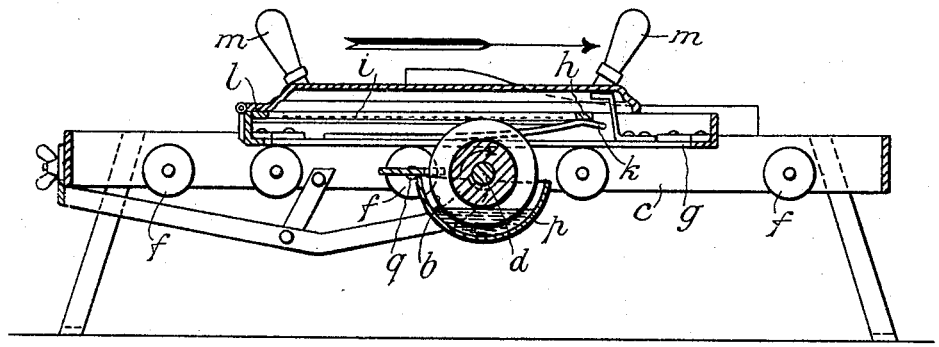
Figure 7:
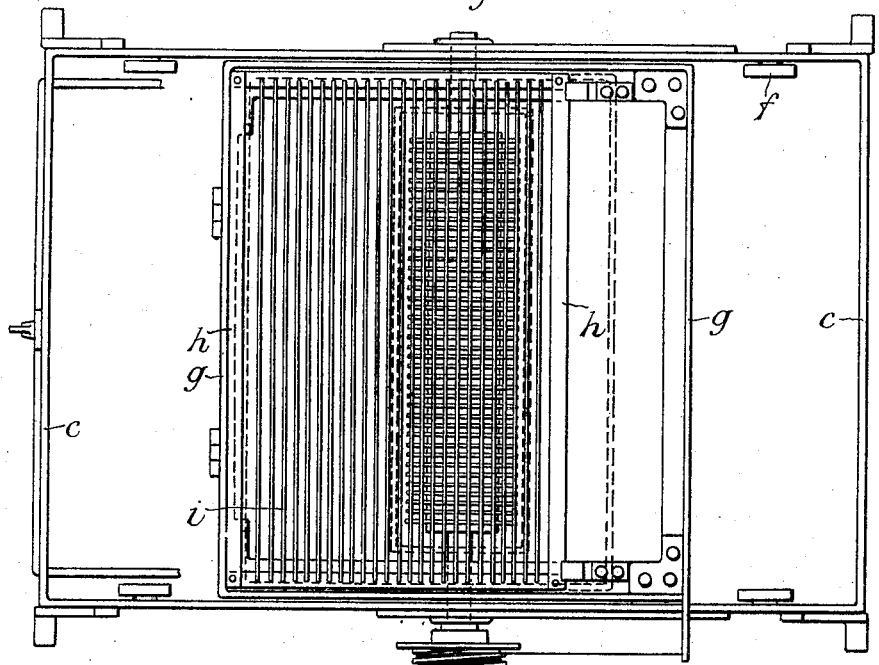

In the drawings, Figure 1 is a side elevation; Fig. 2, a plan; Fig. 3, a partial front elevation. Figs. 4 and 5 show details. Fig. 6 is a longitudinal section, and Fig. 7 a top plan.

The apparatus consists, essentially, of a roller $a$, which has annular projections $b$ on its periphery. The said roller is rotatably mounted in the frame $c$, and the shaft $d$ of the roller $a$ bears the driving-pulley $e$. The driving of the roller takes place in the following manner: In the frame $c$ are rotatably mounted rollers $f$, on which runs a carriage $g$. The latter serves for securing the frame $h$, on which are secured in a known manner the strips $i$ for receiving the inflammable material. By means of the spring $k$ the frame is secured in the carriage $g$. On the carriage is hinged a cover $l$, which carries the handles $m$. If a frame $h$, with strips $i$, is placed in the carriage $g$, the cover $l$ will be folded down and the carriage moved over the roller $a$ by pushing on the handles $m$. The strips thus press on the rollers, the strips lying parallel to the shaft $d$ of the roller $a$. The carriage is connected to a cord which is passed over the driving-pulley $e$ and bears a weight $o$ at its free end. As the carriage is pushed forward, the roller $a$ must be turned, through the connecting-cord, at the same speed as that at which the carriage is moved forward. The roller itself runs in a trough $p$, which is filled with inflammable compound, so that the lower half of the roller always moves in the said compound. The said projections on the roller thus take up inflammable material during rotation, which is transmitted to the strips. In order that too much inflammable material shall not be carried out of the trough, a comb-shaped wiper or scraper $q$ is provided.

What I claim is—

In a machine for the manufacture of matches in the form of strips, a base, a trough, a roller rotatably mounted in said trough, projections on the periphery of said roller, an equalizing-scraper coacting with said roller, a movable carriage provided with a cover, a strip-carrying frame adapted to be mounted in said carriage, a spring arranged in the carriage for retaining the strip-carrying frame within the carriage, handles carried by the cover of the carriage and means for rotating said roller, substantially as described.

In witness whereof I have hereunto set my hand in presence of two subscribing witnesses.

CARL WOLF.

Witnesses:
   SIEGFRIED HERZBERG,
   HENRY HASPER.